(12) United States Patent
National

(10) Patent No.: US 9,873,072 B2
(45) Date of Patent: Jan. 23, 2018

(54) FRAME ASSEMBLY FOR AN AIR FILTER

(71) Applicant: Camfil AB, Stockholm (SE)

(72) Inventor: Pascal National, La Garenne Colombes (FR)

(73) Assignee: CAMFIL AB, Stockholm (SE)

( * ) Notice: Subject to any disclaimer, the term of this patent is extended or adjusted under 35 U.S.C. 154(b) by 182 days.

(21) Appl. No.: 14/778,474

(22) PCT Filed: Mar. 19, 2013

(86) PCT No.: PCT/EP2013/055702
§ 371 (c)(1),
(2) Date: Sep. 18, 2015

(87) PCT Pub. No.: WO2014/146695
PCT Pub. Date: Sep. 25, 2014

(65) Prior Publication Data
US 2016/0067642 A1  Mar. 10, 2016

(51) Int. Cl.
*B01D 46/00* (2006.01)
*B01D 46/10* (2006.01)

(52) U.S. Cl.
CPC ........ *B01D 46/0005* (2013.01); *B01D 46/10* (2013.01); *B01D 2265/026* (2013.01); *B01D 2265/028* (2013.01); *B01D 2273/14* (2013.01)

(58) Field of Classification Search
CPC .. B01D 46/0005; B01D 46/008; B01D 46/10; B01D 2265/026; B01D 2265/028; B01D 2273/14
See application file for complete search history.

(56) References Cited

U.S. PATENT DOCUMENTS

| 3,016,984 A | 1/1962 | Getzin |
| 2008/0121107 A1 | 5/2008 | Pfannenberg |
| 2012/0204523 A1 | 8/2012 | Woolard |

FOREIGN PATENT DOCUMENTS

| DE | 202006015789 U1 | 12/2006 |
| EP | 2561915 A1 | 2/2013 |
| WO | WO-2012134650 A1 | 10/2012 |

OTHER PUBLICATIONS

International Search Report PCT/ISA/210 for International Application No. PCT/EP2013/055702 dated Nov. 18, 2013.
Written Opinion of the International Searching Authority PCT/ISA/237 for International Application No. PCT/EP2013/055702 dated Nov. 18, 2013.

*Primary Examiner* — Robert Clemente
(74) *Attorney, Agent, or Firm* — Harness, Dickey & Pierce, PLC

(57) ABSTRACT

There is provided a frame assembly 200 adapted for installation in a filter housing of an air handling system. The frame assembly is arranged having a frame 210 which is adapted to receive a filter unit of a predetermined size. The frame assembly further comprises a clamping mechanism 230 arrange for clamping the filter unit. An actuator 231 of the clamping mechanism is arranged at a front member 211 of the frame and is operable between an open and a closed position while activating the clamping mechanism to clamp the filter unit. An actuator element 232 facing a back member 212 of the frame is arranged such that a free distance between the actuator element and the back member during operation of the actuator corresponds to the predetermined filter unit size, thereby enabling operation of the actuator only if an inserted filter unit abuts the back member of the frame.

11 Claims, 4 Drawing Sheets

FRAME ASSEMBLY FOR AN AIR FILTER

CROSS-REFERENCE TO RELATED APPLICATIONS

This is a National Phase of PCT/EP2013/055702, filed on Mar. 19, 2013. The entire contents of each of the above applications are incorporated herein by reference in their entirety.

FIELD OF THE INVENTION

The present invention relates to air handling systems and more particularly to a frame assembly adapted for clamping an air filter unit in a filter housing.

BACKGROUND OF THE INVENTION

In air filtration systems requiring high efficiency filters such as High-Efficiency Particulate Air (HEPA) filters and other high efficiency filters, it is known to use some type of filter holding frame and a mechanical clamping mechanism to secure and effectively seal the filter to the holding frame. Such holding frames may be positioned within air ducts or filter housings of the air handling system. WO2012/134650 discloses a filter holding frame with an adjustable mechanical clamping mechanism including a frame having a downstream member coupled to a cross member, the downstream member and the cross member being adapted to fit within a housing. The frame assembly comprises at least two clamping mechanisms each coupled to a respective handle which is used to displace the frame assembly thereby clamping a filter unit received in a filter receiving aperture defined above the cross-member. When utilizing such mechanical clamping mechanisms to seal high efficiency filters, it is a requisite to ensure that any bypass or leakage around the seal is less than the maximum penetration of the filter.

Filter holding frames and clamping mechanisms as described above are typically used in critical filtration applications like for instance nuclear, pharmaceutical and risk laboratories. Very high safety standards complying with for instance increasingly stringent requirements from bio-safety authorities are thus applied. Periodic replacement of the filters is required to meet regulatory, and may involve the replacement of a large number of filters on a regular bases. A potential problem with clamping mechanism of the above type and others is that any mistake made during replacement of the filters in the air handling system, e.g. if the filters are not properly positioned, the clamping mechanism are not properly closed etc, could have devastating effects like causing a global pandemic.

SUMMARY OF THE INVENTION

It is an object of the present invention to provide an improved frame assembly which eliminates, or at least reduces the above mentioned and other drawbacks. It is a further object to provide a frame assembly which reduces the risk for human error during replacement and installation of filters, and which provides an improved safety level in air handling system. These and other objects are achieved by a frame assembly according to the present invention as defined in claim 1 of the appended claims. Preferred embodiments of the present invention are defined in the dependent claims.

Thus, in accordance with an aspect of the present invention there is provided a frame assembly adapted for installation in a filter housing. The frame assembly comprises a frame adapted to receive a filter unit of a predetermined size, and at least one clamping mechanism for clamping the filter unit. The clamping mechanism comprises an actuator, e.g. a handle, arranged at a front member of said frame. The actuator is operable between an open and a closed position while activating the clamping mechanism to clamp the filter unit. The actuator is arranged having at least one actuator element facing a back member of the frame, which actuator element is arranged such that during operation of the actuator, a free distance between the actuator and the back member of the frame corresponding to the predetermined filter unit size, is governed by the actuator element and the back member of the frame. Thus, if a filter unit is inserted in the frame assembly, operation of the actuator is only possible if the inserted filter unit abuts said back member of the frame.

The actuator of the mechanical clamping is thus advantageously providing a control functionality, which ensures that the filter unit is placed all the way into its intended position in the frame, and thus bears against the back member of the frame, or to be more precise, bears against some stop portion of the back member which indicates the correct position of the filter unit, before the clamping mechanism can be activated by moving the handle from an open to a closed position. The back frame member may be provided with e.g. a flange or other suitable stop portion of the back member, which prevents the filter unit from being moved further back. If the filter is not in the correct position, i.e. not pushed all the way back to its intended position, the actuator element effectively hinders the actuator from being operated since its trajectory during operation overlaps with (a frame of) the filter unit. This effectively ensures that correct mounting of the filter unit for upstream sealing of the filter unit is provided.

According to an embodiment of the frame assembly, the at least one actuator element is a protruding portion arranged on the actuator and pointing backwards towards the back element.

According to an embodiment of the frame assembly, the actuator is a lever arranged to be pivotable between the open and closed position. The actuator element may be arranged as a protruding portion arranged somewhere along the lever, and preferably at an end portion of the lever, such that the actuator is substantially U-shaped, the latter facilitating for a user to grip the lever as a handle.

According to an embodiment of the frame assembly, the front member is provided with at least one opening for receiving the actuator element or allowing free passage of the actuator element when the actuator is in the open position or the closed position, which is advantageous when an actuator has an actuator element which overlaps the front member.

According to an embodiment of the frame assembly, the clamping mechanism is a spring loaded clamping device, which facilitates a quick clamping of the filter unit in order to press it air tight towards a receiving face of the filter housing. According to an embodiment, the clamping mechanism comprises a spring element, and an excenter mechanism arranged for displacing the frame and filter unit when activating the clamping mechanism such that the filter unit is clamped.

According to an embodiment of the frame assembly, the back member, and optionally side members of the frame, comprises respective flange portions for guiding of the filter unit, which is advantageous. The distance between the side flanges is selected to match a predetermined filter unit size, which thus indicates to the user if the current filter unit being inserted to the frame assembly is of correct filter unit size (width). For rectangular filter units this will further indicate if the filter unit being inserted into frame assembly is correctly oriented.

According to a second aspect the present invention provides an air handling assembly, comprising a filter housing and a frame assembly according to the present inventive concept, which frame assembly is arranged in a compartment of the filter housing. This type of housing is advantageously used for so called bag-in-bag-out mounting of filters.

According to an embodiment of the air handling assembly, it further comprises a door for sealing an access opening of the compartment. The door is provided with a blocking element preventing closing of the door if the actuator of the clamping mechanism is not in a closed position. The blocking element further hinders the actuator from moving, thereby loosening the clamping of the filter unit, when the door is closed.

Further objects and advantages of the present invention will be discussed below by means of exemplifying embodiments. These and other features, aspects and advantages of the invention will be more fully understood when considered with respect to the following detailed description, appended claims and accompanying drawings.

BRIEF DESCRIPTION OF THE DRAWINGS

The invention will now be described in more detail and with reference to the appended drawings in which.

DESCRIPTION OF PREFERRED EMBODIMENTS

Figure 1A:
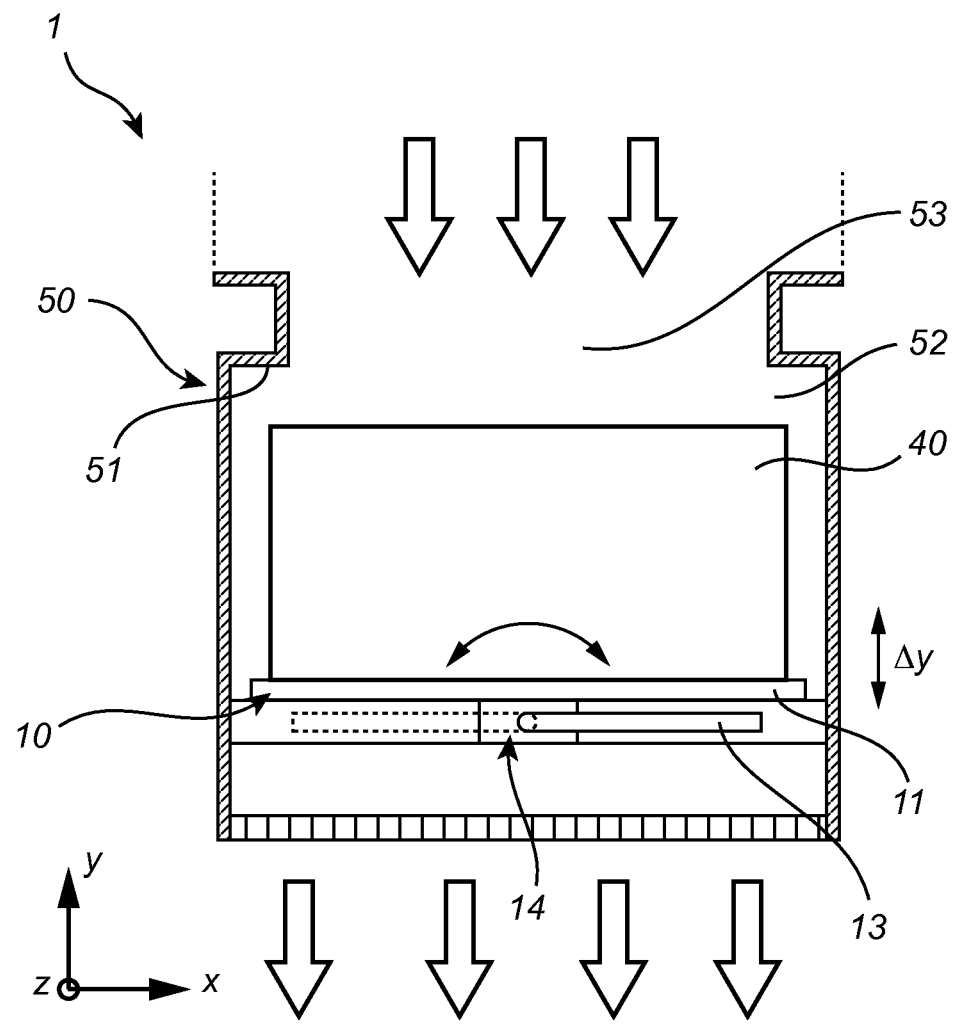
FIGS. 1a and 1b show a schematic cross-sectional view and a perspective front view, respectively, of an air handling assembly comprising a prior art frame assembly.

FIG. 1a is a cross-sectional view of a portion of an air handling assembly 1 schematically illustrating a filter housing 50 in which a replaceable filter unit 40 is arranged. The filter housing 50 is here a gastight, welded sheet steel construction having a compartment 52 in which a frame assembly 10 is disposed. The housing 50 may include an access opening and a corresponding door for facilitating maintenance, installation of, or removal of the filter unit 40, see FIG. 1b. The frame assembly 10 is movably coupled to the housing and is arranged to receive and support the filter unit 40 when in position. The frame assembly 10 includes an aperture that is adapted to allow air to pass there through, and is adapted to move in the y-direction to push the filter unit 40 against a holding frame defined by surface 51 of the compartment 52. The movement in the y-direction of the frame assembly 10 is governed by a clamping mechanism 14. The clamping mechanism 14 is arranged to clamp the filter unit 40 from beneath by dislocating the frame assembly in a vertical direction, in FIG. 1a the displacement is illustrated by a double arrow denoted Δy, thereby pressing the filter unit 40 upwards towards the receiving inner surface 51 of the compartment 52. The inner surface 51 is arranged to encompass an air intake area 53 of the filter housing 50. As mentioned above, this inner surface 51 is typically arranged defining a holding frame for receiving the filter unit, or alternatively a separate holding frame is arranged at the air intake area 53. The inner surface 51, or the separate holding frame, may be provided with e.g. a gasket or other seal (not shown), to prevent air from passing through, and towards which gasket the filter unit is clamped. However, preferably the filter unit itself is provided with a gasket or other seal for the same purpose. Thereby the gasket, which may deteriorate over time due to aging effects, is replaced simultaneously as the filter unit.

When fitting in a filter unit in the filter housing 50, the filter unit is entered into the compartment 52 through the access opening of the housing, and is then placed into the frame assembly 10. The filter unit is then clamped by turning a clamping lever 13, arranged for actuating the clamping mechanism 14, from an open position, here corresponding to the lever 13 being in its right position, to the closed position, here corresponding to the lever 13 being in its left position (dashed position in FIG. 1a). Here actuation of the clamping mechanism corresponds to pivoting the clamping lever 180 degrees from right to left. As the clamping lever 13 is turned, the clamping mechanism 14 is activated. The clamping lever 13 is substantially L-shaped, where one leg of the L-shaped body coinciding with the pivoting axle of the lever and one leg of the L-shaped body forming the handle which the user operates (compare for instance with a door handle). That is, the lever is suitable for a user to grab and operate, and it protrudes in a forward direction with respect to the frame assembly.

Figure 1B:
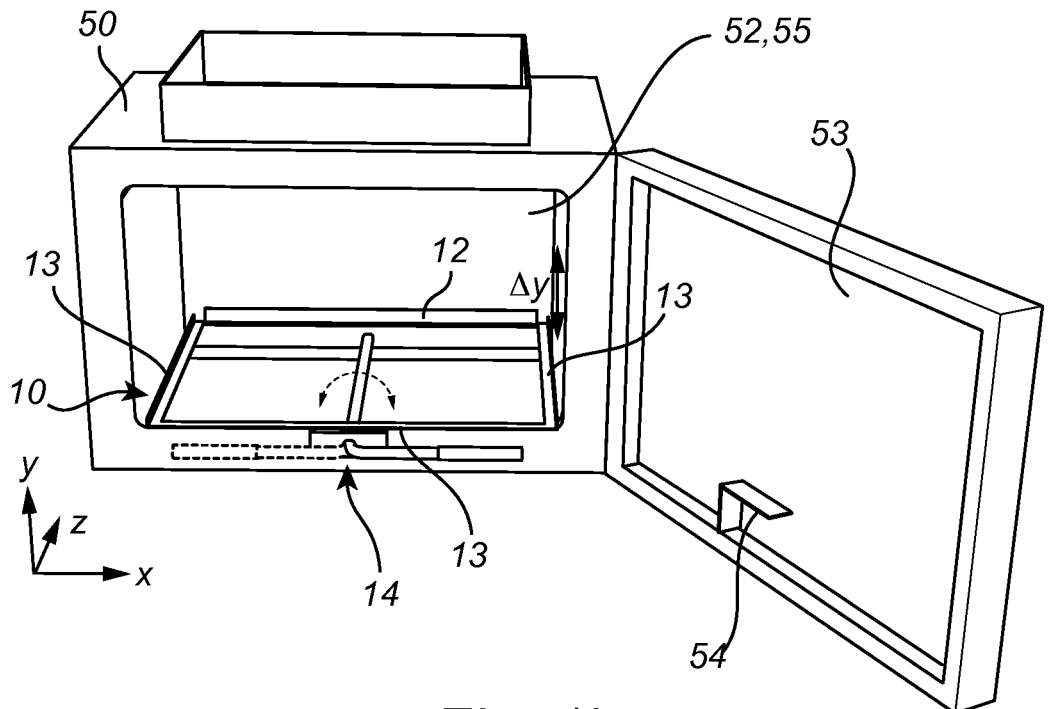

FIG. 1b is a front perspective view of a housing 50 as illustrated in FIG. 1a, which is here illustrated without a filter unit. The housing comprises an access opening 55 through which the compartment 52 is accessible, and a door 53, which seals the compartment under normal operation of the air handling system. The frame assembly 10 is arranged in the compartment 52 is a prior art solution. On an inside of the door 53, a blocking mechanism 54 for preventing closing of the door when the clamping lever 13 is not in a closed position. The blocking mechanism is here a protruding L-shaped flange 54, which protrudes from the inner side of the door towards the frame assembly when the door is in a closed position. The L-shaped flange 54 is further arranged at a position corresponding to the pivot axle of the clamping lever 13, and oriented so as to prevent closing of the door 53 when the clamping lever 13 is in any position but the closed position (when the lever is turned all the way to its left position).

Figure 2A:
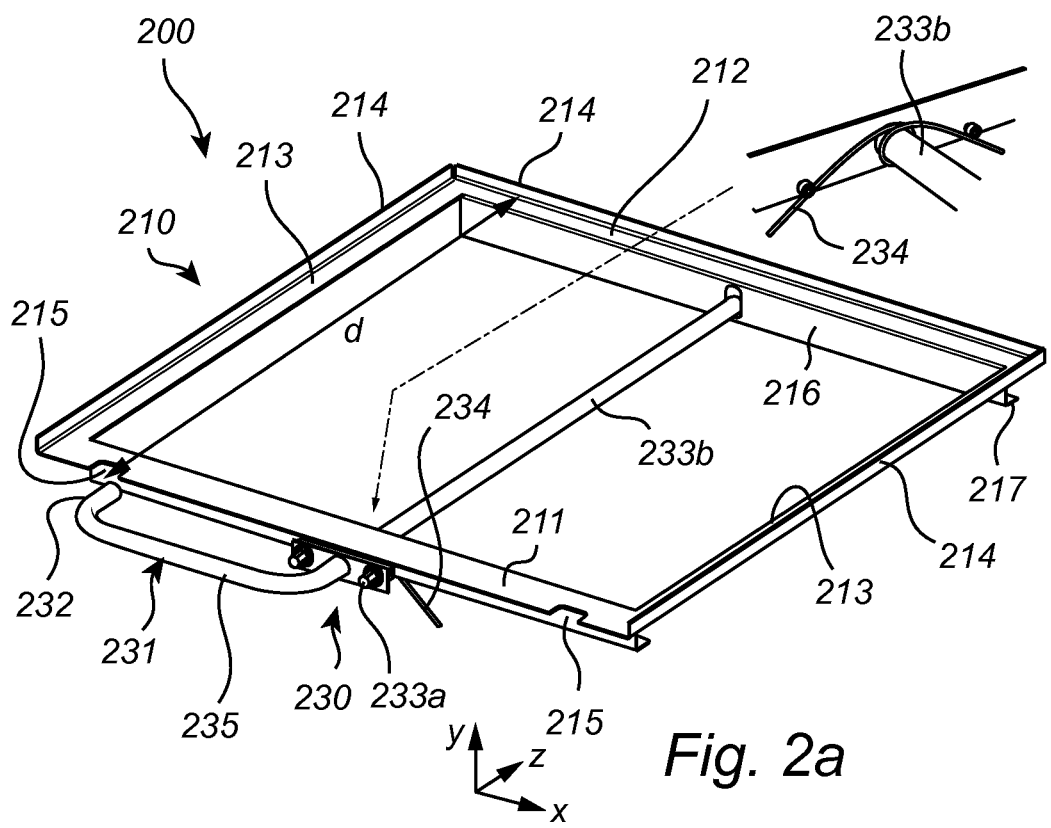
FIG. 2a is a perspective view of an embodiment of a frame assembly according to the present invention.

Referring now to FIG. 2a, a schematic perspective view of an exemplifying embodiment of a frame assembly 200 according to the present invention is illustrated. The frame assembly 200 comprises a substantially rectangular frame 210, which is adapted to receive a filter unit of a predetermined size. The frame 210 has a front member 211, two side members 213, and a back member 212, which form the frame 210 and which together encompasses an open aperture which is typically dimensioned to fit a filtering area of the filter unit. The upper surfaces of the frame members 211, 212, 213 together receive the filter unit and are typically dimensioned to at least fit a frame of the filter unit.

According to the shown embodiment of the frame assembly, the back member 212, and the side members 213, respectively, each comprises an upturned flange 214. The flanges 214 and the horizontal areas of the frame members provide a guide for the filter unit as it is pushed into the frame 210. To continue, the frame assembly 200 further comprises a spring loaded clamping mechanism 230. In the exemplifying embodiment, the clamping mechanism 230 is a spring loaded quick clamping device which comprises a spring loaded shaft 233b arranged extending from the front element 211 to a vertical displacement element 216 of the back element 212 of the frame, and an excenter mechanism 233a comprising two eccentric cams (not shown) in contact with the frame 210. The shaft 233b is coupled to an actuator, a lever 231, to the spring element 234, and to the excenter mechanism. As the excenter mechanism 233a is actuated by rotation of the lever 231 from the open position to the closed position the two cams are activated and together dislocate the front member 211 of the frame 210, such that the front member of the frame is tilted upwards, i.e. is dislocated Δy, while the spring element 234 presses the filter unit 40 upwards (to be received by a holding frame or receiving surface of the housing, see FIG. 2c). When the frame assembly 200 is mounted in filter housing 253, in which it is movably coupled to the wall or a support structure of the housing, as illustrated in FIG. 2c, clamping of a filter unit arranged in the frame assembly 200 against an inner surface or holding frame of the filter housing 253 is thereby provided. When the lever 231 is turned in the opposite direction, from the closed to the open position, the clamping mechanism 230 is deactivated and the filter frame is released as the spring is rotated back and the and the front member of the frame is lowered.

In the exemplifying embodiment 200 of the frame assembly according to the present invention, the actuator, i.e. lever 231, of the clamping mechanism 230 is substantially U-shaped. That is, as compared to the substantially L-shaped prior art solution as described with reference to FIG. 1, the actuator is according to the present inventive idea provided with a backwards protruding portion 232 arranged on the end portion of the lever 231. Other positions along the lever are applicable, but for the sake of using a middle portion 235 of the lever as a handle, the end portion of the lever is the most optimal position. The backwards protruding portion 232 is dimensioned such that the distance d between its end and the back member 212, or more precisely the flange 214 of the back member 212 which is arranged as a stop with respect to pushing a filter unit into the filter assembly, corresponds to the predetermined size in depth (z-dimension in the FIGS.) of the filter unit to be received in the frame assembly.

According to the shown embodiment, the protruding portion 232 of the actuator 231 overlaps with the extension in depth of the front member 211. To allow the actuator 231 to be turned a full 180 degrees between an open position, when the lever is turned to the right, and a closed position, when the lever is turned to the left, the front member 211 is provided with two cut out openings 215, each positioned for receiving the actuator element, i.e. the protruding portion 232, or allowing free passage of the protruding portion 232, when the actuator 231 is in the open position or the closed position, respectively.

Figure 2B:
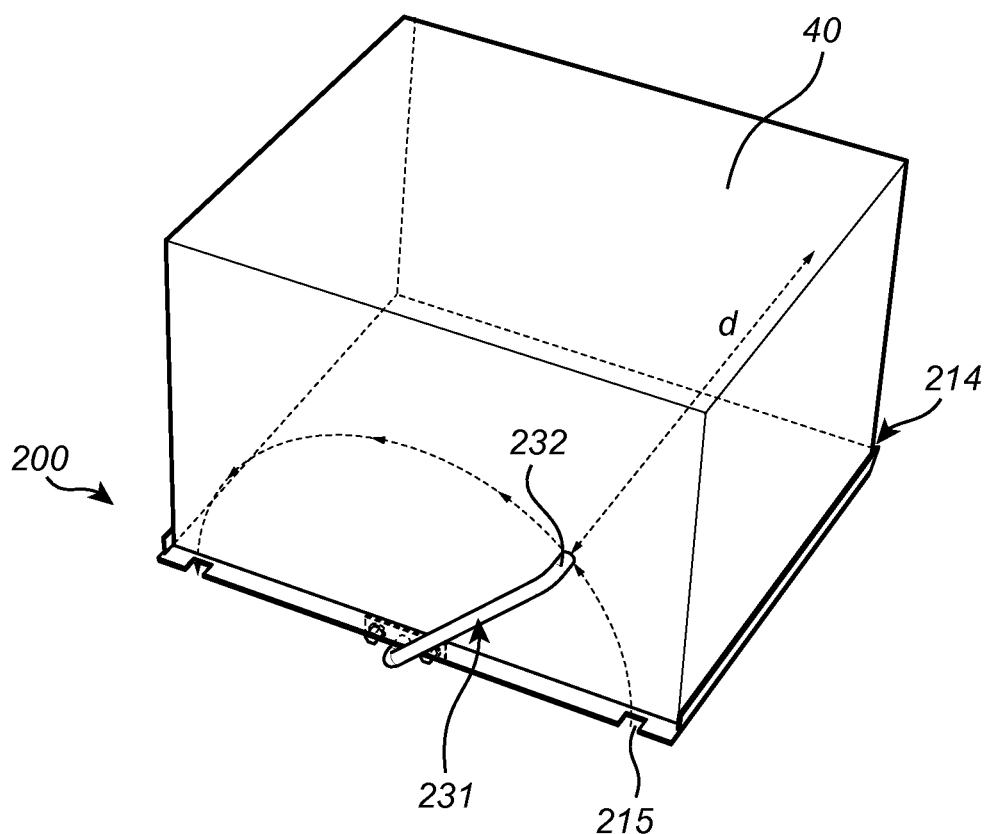
FIG. 2b illustrates the frame assembly shown in FIG. 2a, when a filter unit is received in the frame.
Figure 2C:
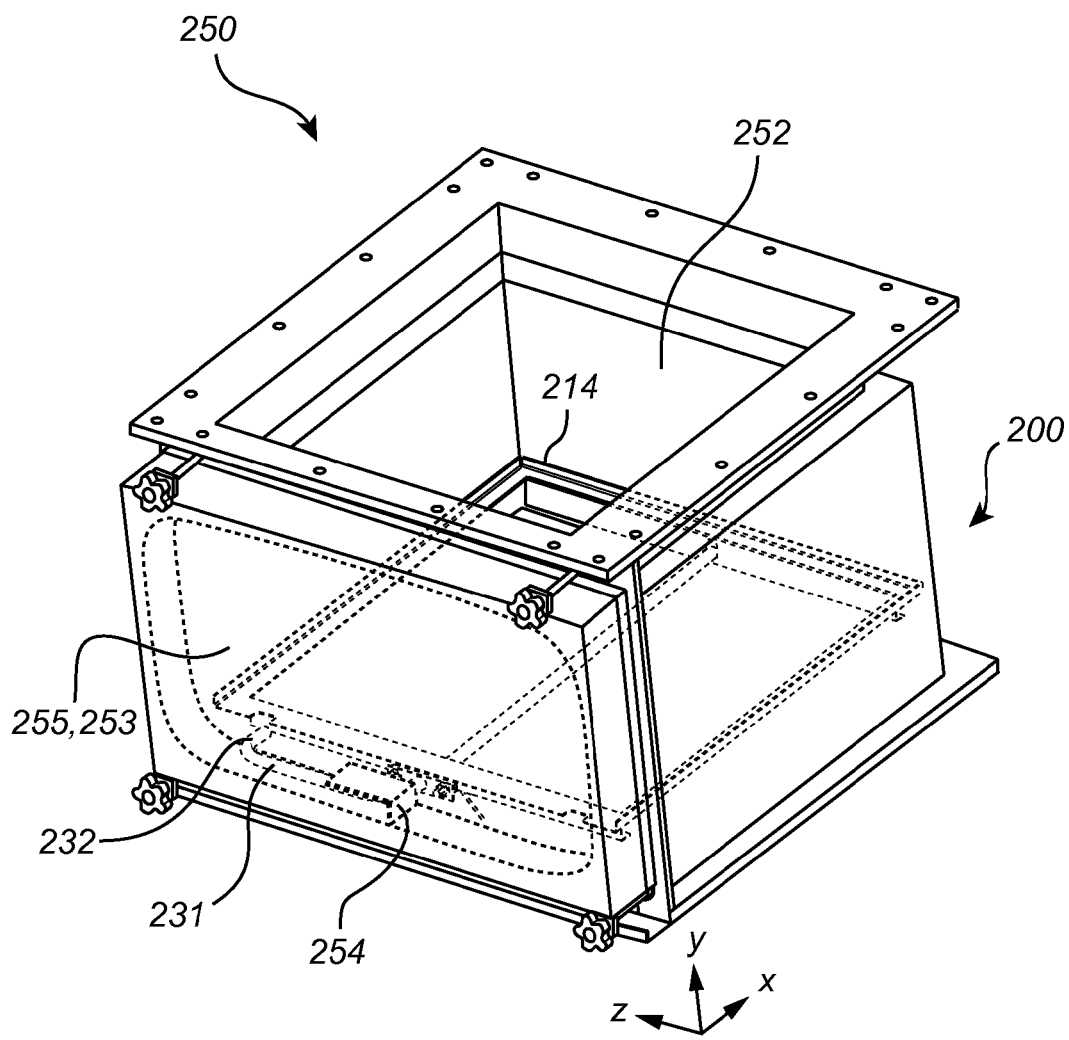
FIG. 2c is a perspective front view of an embodiment of an air handling assembly comprising an embodiment of a frame assembly according to the present invention.

In FIG. 2b a filter unit 40 is received in the frame assembly 200. Only when the filter unit 40 is pushed all the way back to bear against the back flange 214, the actuator 231 is operable between its open and closed position. As the free distance d between the actuator element 232 and back flange 214 (the vertical plane at the back flange to be more exact) is limited to the size in depth of the filter unit 40, if the filter unit 40 is not properly placed, the actuator element 32 overlaps with the filter unit and cannot be operated.

In the exemplifying embodiment herein, the actuator is provided by means of a lever, and the clamping mechanism is a spring loaded excenter element. It should be understood though that other actuators and clamping mechanisms are applicable with the present inventive concept. Any actuator arranged to govern a clamping mechanism, and which is arranged at a front member of the frame, and which is operable between an open position (when the clamping mechanism is not activated and the filter unit is released) and a closed position (when the clamping mechanism is actuated and the filter unit is clamped), where some actuator element governs the free distance between the actuator and the back member of the frame during operation of the actuator is applicable.

Referring now to FIG. 2c, which is a perspective partly see through view of the frame assembly 200 when positioned inside a housing 250 comprising an access opening 255 through which a compartment 252 is accessible, and a door 253, which seals the compartment 252 under normal operation of the air handling system. When fitting in a filter unit in the filter housing 250, the door 253 is opened, the filter unit is entered into the compartment 252 through the access opening of the housing 250, and is then placed into the frame assembly 200 by being gently pushed into the frame 210 until it stops against the back element flange 214. For the filter unit to fit into the compartment, and the frame assembly 200, the clamping mechanism must be in its open position, such that the frame assembly 200 is in its (lower) initial vertical position. The actuator 231 is then in its right position and the protruding portion 232 is in the right cut out opening 215 of the front member 211. That is, the actuator is positioned below the frame assembly which allows the filter unit to be slid into place in the frame assembly 200. The filter unit is then clamped by turning the clamping lever 231. If the filter unit is not in its intended position, the protruding portion 232 will be hindered by the filter unit, and the clamping mechanism cannot be actuated until the filter unit is pushed into its intended position.

On an inside of the door 253, a blocking mechanism 254 for preventing closing of the door when the clamping lever 231 is not in a closed position. The blocking mechanism is here a protruding L-shaped flange 254, which protrudes backwards with respect to the frame assembly 200 when the door 253 is closed, and which is further arranged at a position corresponding to the pivot axle of the clamping lever 231, and oriented so as to prevent closing of the door 253 when the clamping lever 231 is in any position but the closed position (when the lever is turned all the way to its left position).

The person skilled in the art realizes that the present invention by no means is limited to the preferred embodiments described above. On the contrary, many modifications and variations are possible within the scope of the appended claims.

The invention claimed is:

1. A frame assembly adapted for installation in a filter housing, the frame assembly comprising:
   a frame adapted to receive a filter unit of a predetermined size; and
   at least one clamping mechanism for clamping said filter unit, the at least one clamping mechanism comprising an actuator arranged at a front member of said frame, wherein said actuator is operable between an open position and a closed position while activating the at least one clamping mechanism to clamp said filter unit;
   wherein said actuator is arranged having at least one actuator element facing a back member of the frame, and wherein during operation of said actuator, a free distance "D" between the at least one actuator element and the back member of the frame corresponds to an in-depth size of said predetermined filter unit size, thereby enabling operation of the actuator between the open position and the closed position only if the inserted filter unit abuts said back member of the frame.

2. A frame assembly according to claim 1, wherein said at least one actuator element is a protruding portion.

3. A frame assembly according to claim 1, wherein said actuator is a lever arranged to be pivotable between said open and closed position.

4. A frame assembly according to claim 2, wherein said front member is provided with at least one opening for receiving said actuator element or allowing free passage of said actuator element when said actuator is in said open position or said closed position.

5. A frame assembly according claim 1, wherein the at least one clamping mechanism is a spring loaded clamping device.

6. A frame assembly according to claim 1, wherein the at least one clamping mechanism comprises a spring element, and an excenter mechanism arranged for displacing the frame when activating the at least one clamping mechanism, thereby providing clamping of said filter unit against an inner wall of said filter housing.

7. A frame assembly according to claim 1, wherein the at least one clamping mechanism comprises a spring element, and a rotatable shaft coupled to said actuator and to said spring element.

8. A frame assembly according to claim 1, wherein said actuator is U-shaped.

9. A frame assembly according to claim 1, wherein said back member, and optionally side members of said frame, comprises respective flange portions for guiding of said filter unit.

10. An air handling assembly, comprising:
a filter housing; and
a frame assembly according to claim 1 arranged in a compartment of said filter housing.

11. An air handling assembly according to claim 10, further comprising a door for sealing an access opening of said compartment, wherein said door is provided with a blocking element preventing closing of said door if said actuator of the at least one clamping mechanism is not in a closed position.

* * * * *